(12) United States Patent
Murayama

(10) Patent No.: US 9,191,540 B2
(45) Date of Patent: Nov. 17, 2015

(54) IMAGE PROCESSING DEVICE AND METHOD OF ACQUIRING AMOUNT OF DENSITY DEVIATION OF LIGHT-EMITTING-ELEMENT GROUP

(71) Applicant: Kentaro Murayama, Kasugai (JP)

(72) Inventor: Kentaro Murayama, Kasugai (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 14/190,119

(22) Filed: Feb. 26, 2014

(65) Prior Publication Data

US 2014/0240800 A1 Aug. 28, 2014

(30) Foreign Application Priority Data

Feb. 28, 2013 (JP) ................................ 2013-038692

(51) Int. Cl.
  *H04N 1/028* (2006.01)
  *H04N 1/00* (2006.01)
  *H04N 1/401* (2006.01)

(52) U.S. Cl.
  CPC ........... *H04N 1/028* (2013.01); *H04N 1/00718* (2013.01); *H04N 1/4015* (2013.01)

(58) Field of Classification Search
  USPC ............................ 358/496, 3.1, 406, 448, 530
  See application file for complete search history.

(56) References Cited

U.S. PATENT DOCUMENTS

| | | | |
|---|---|---|---|
| 2005/0062830 A1* | 3/2005 | Taki et al. ..................... | 347/130 |
| 2008/0192319 A1* | 8/2008 | Miyatake et al. ............. | 359/204 |
| 2009/0091805 A1* | 4/2009 | Tanabe et al. ................ | 358/475 |
| 2010/0061740 A1 | 3/2010 | Murayama | |
| 2010/0074638 A1 | 3/2010 | Murayama | |
| 2011/0181679 A1* | 7/2011 | Arai et al. ..................... | 347/224 |
| 2012/0147114 A1* | 6/2012 | Yokoyama et al. ............ | 347/118 |
| 2013/0155164 A1* | 6/2013 | Kamei ........................... | 347/118 |
| 2014/0240431 A1 | 8/2014 | Murayama | |
| 2014/0240800 A1 | 8/2014 | Murayama | |

FOREIGN PATENT DOCUMENTS

| | | |
|---|---|---|
| JP | H05-84972 A | 4/1993 |
| JP | 2005-077358 A | 3/2005 |
| JP | 2005-088371 A | 4/2005 |
| JP | 2006-256050 A | 9/2006 |

OTHER PUBLICATIONS

Jan. 15, 2015—(US) Non-Final Office Action—U.S. Appl. No. 14/190,119.
Jan 16, 2015—(US) Non-Final Office Action—U.S. Appl. No. 14/191,635.

* cited by examiner

*Primary Examiner* — Jerome Grant, II
(74) *Attorney, Agent, or Firm* — Banner & Witcoff, Ltd.

(57) ABSTRACT

An image forming section includes a bearing member configured to bear an image, and a plurality of light-emitting-element groups each having a plurality of light emitting elements arranged linearly in an arrangement direction. The image forming section forms an image on the bearing member by using the light-emitting-element groups to transfer the image on a sheet. The reader reads an image on a sheet. When executed by the processor, the instructions cause the processor to perform: a pattern reading process of controlling the reader to read a pattern image, the pattern image being an image for detecting density deviation and formed on the sheet by using the light-emitting-element groups; and a calculating process of calculating an amount of density deviation of each of the light-emitting-element groups based on a reading result by the pattern reading process. Each light-emitting-element group is a unit of calculation of the amount of density deviation.

20 Claims, 10 Drawing Sheets

IMAGE PROCESSING DEVICE AND METHOD OF ACQUIRING AMOUNT OF DENSITY DEVIATION OF LIGHT-EMITTING-ELEMENT GROUP

CROSS REFERENCE TO RELATED APPLICATIONS

This application claims priority from Japanese Patent Application No. 2013-038692 filed Feb. 28, 2013. The entire content of the priority application is incorporated herein by reference.

TECHNICAL FIELD

The invention relates to an image processing device and a method of acquiring an amount of density deviation of a light-emitting-element group by the image processing device.

BACKGROUND

It is conventionally known that an exposure device equipped in an electro-photographic-type image forming apparatus uses a light-emitting-element group, such as a light-emitting-element array, in which a plurality of light emitting elements is arranged linearly. It is also known to acquire a correction value of the amount of positional deviation of the light-emitting-element group etc., and to use the correction value to perform image processing of adjusting the lighting timing and the light emitting amount of light emitting elements.

SUMMARY

As technology of acquiring the correction value of the light-emitting-element group as described above, a position detecting device is disclosed. In this position detecting device, the inspection target is a product structure having a plurality of light-emitting-element arrays. The positional relationships of each light-emitting-element array relative to each other are detected, and a gap of the connection between the light-emitting-element arrays is measured.

However, if the above-described external device is used to measure the correction value before the light-emitting-element group is attached to the main body of the image processing device, density deviation caused by the attachment cannot be reflected in the correction value. For example, density deviation is caused by variances in electric resistance of a cable and a connector that electrically connect the light-emitting-element group and the image forming apparatus.

In view of the foregoing, according to one aspect, the invention provides an image processing device. The image processing device includes an image forming section, a reader, a processor, and a memory storing instructions. The image forming section includes a bearing member configured to bear an image, and a plurality of light-emitting-element groups each having a plurality of light emitting elements arranged linearly in an arrangement direction. The image forming section is configured to form an image on the bearing member by using the plurality of light-emitting-element groups to transfer the image on a sheet. The reader is configured to read an image on a sheet. When executed by the processor, the instructions cause the processor to perform: a pattern reading process of controlling the reader to read a pattern image, the pattern image being an image for detecting density deviation and formed on the sheet by using the plurality of light-emitting-element groups; and a calculating process of calculating an amount of density deviation of each of the plurality of light-emitting-element groups based on a reading result by the pattern reading process, each of the plurality of light-emitting-element groups being a unit of calculation of the amount of density deviation.

According to another aspect, the invention also provides a method of acquiring an amount of density deviation of a light-emitting-element group mounted on an image processing device. The light-emitting-element group has a plurality of light emitting elements arranged linearly. The method includes: controlling a reader to read a sheet on which a pattern image is formed, the pattern image being an image for detecting density deviation of the light-emitting-element group; and calculating an amount of density deviation of the light-emitting-element group based on a reading result by the reader.

BRIEF DESCRIPTION OF THE DRAWINGS

Embodiments in accordance with the invention will be described in detail with reference to the following figures wherein.

DETAILED DESCRIPTION

Embodiments of the invention will be described in detail while referring to drawings. In the present embodiment, the invention is applied to a multifunction peripheral (MFP) having an image reading function and an image forming function.

[Configuration of MFP]

Figure 1:
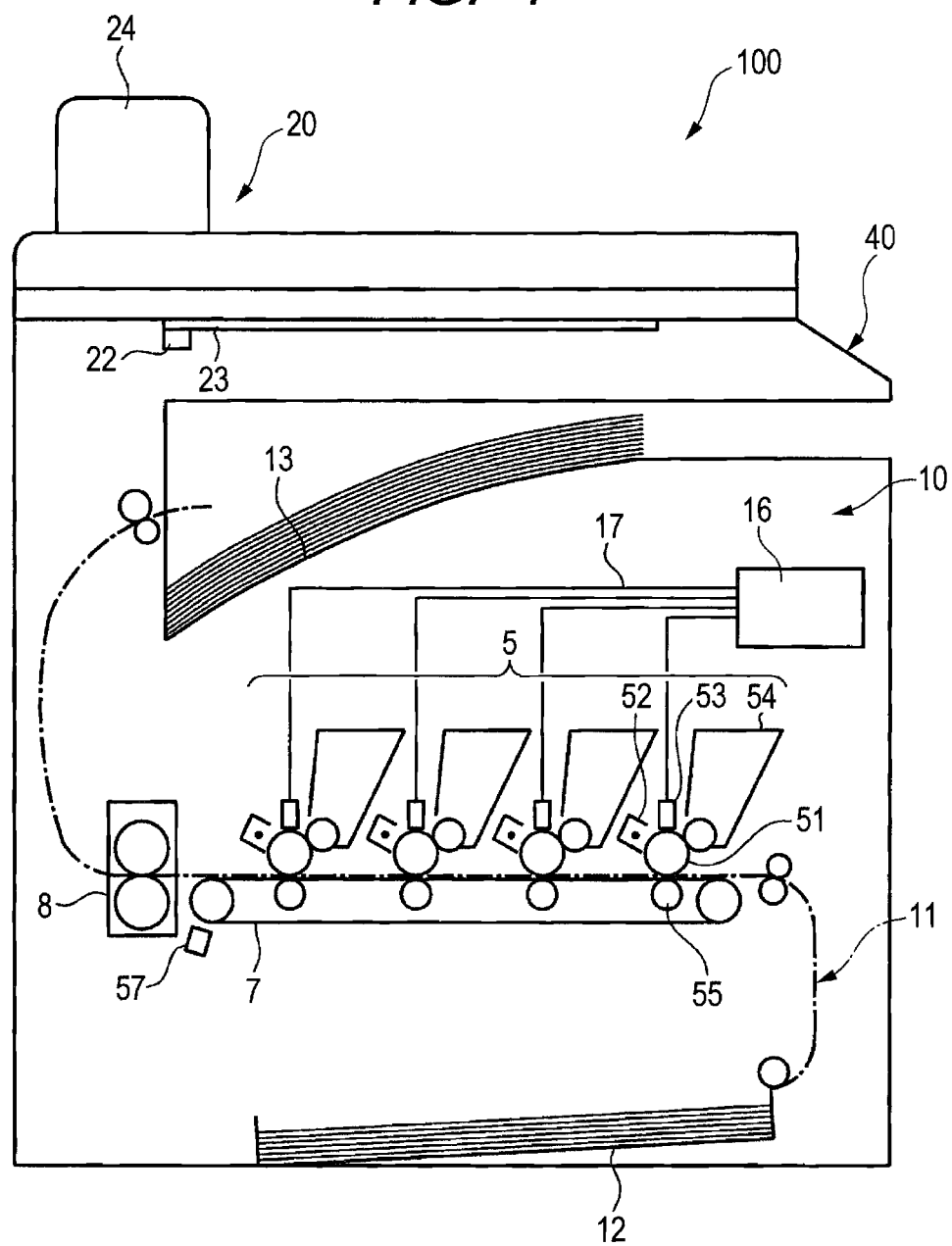
FIG. 1 is a cross-sectional view showing the schematic configuration of an MFP according to an embodiment of the invention.

As shown in FIG. 1, the MFP 100 of the present embodiment includes an image forming section 10 that prints an image on a sheet, an image reading section 20 that reads an image on an original document, and an operation panel 40 that displays an operation status and that receives an input operation by a user. The image forming section 10 is an example of an image forming section, and the image reading section 20 is an example of a reader.

The image forming section 10 includes a processing section 5 that forms a toner image on a sheet by an electrophotographic method, a conveying belt 7 that conveys the sheet, a fixing section 8 that fixes the unfixed toner image on the sheet, a paper supplying tray 12, and a paper discharging tray 13. The processing section 5 includes a photosensitive member 51, a charging section 52, an exposing section 53, a developing section 54, and a transfer section 55 for each color of yellow (Y), magenta (M), cyan (C), and black (K). Further, a conveying path 11 is formed in the apparatus, along which a sheet supplied from the paper supplying tray 12 passes through the processing section 5 and the fixing section 8, and is discharged to the paper discharging tray 13. The photosensitive member 51 is an example of a bearing member. The conveying belt 7 and the conveying path 11 serve as an example of a conveyer. A sheet conveying direction is a direction in which a sheet is conveyed by the conveyer.

At the time of image formation, the photosensitive member 51 is charged by the charging section 52, and is exposed by the exposing section 53. With this operation, an electrostatic latent image based on image data is formed on a surface of the photosensitive member 51. Further, the electrostatic latent image is developed with toner supplied by the developing section 54, so that a toner image is formed on the photosensitive member 51. On the other hand, a sheet on which an image is to be formed is conveyed to the processing section 5 along the conveying path 11. At that time, the transfer section 55 transfers the toner image onto the sheet from the photosensitive member 51. Subsequently, the toner image borne on the sheet is fixed to the sheet by the fixing section 8. Note that FIG. 1 also shows a sensor 57 for detecting toner on the conveying belt 7.

The image reading section 20 includes an image sensor 22 for optically reading an image, a contact glass 23, and an ADF (automatic document feeder) 24. The image sensor 22 includes optical elements arranged in the direction perpendicular to the drawing sheet of FIG. 1. The image reading section 20 causes the image sensor 22 and an original document sheet on which an image is formed to move relative to each other, thereby reading the image one line at a time. The moving method may be a method of moving the image sensor 22 while the original document sheet is fixed, or may be a method of moving the original document sheet by the ADF 24 while the image sensor 22 is fixed. A main scanning direction of the image reading section 20 is a direction in which the optical elements of the image sensor 22 are arranged. A sub-scanning direction is a direction perpendicular to the main scanning direction, and is a direction in which the sheet moves relative to the image sensor 22.

The image reading section 20 acquires image data based on reflection of light in each position of an original document. For example, image data at that position can be acquired based on the amount of light received by each optical element. Then, based on a reading result by the image reading section 20, the MFP 100 can acquire a position coordinate of the image in a sheet surface. Note that the image reading section 20 may be a type of capable of color reading, or may be a type of only capable of monochromatic reading.

The MFP 100 includes a power source section 16 that supplies each section in the apparatus with electric power. Each exposing section 53 is connected with the power source section 16 via wiring 17. Because the wiring 17 has wires of different length for each exposing section 53, the resistance value of the wiring 17 differs for each exposing section 53. Further, as will be described later, the exposing section 53 of the MFP 100 has a plurality of LED units 61 (see FIG. 2). Depending on arrangement of the LED units 61 and the like, lengths of wires of the wiring 17 connecting the power source section 16 with the LED unit 61 are not all the same. Hence, there is a possibility that the resistance value between each LED unit 61 and the power source section 16 differs for each LED unit 61.

[Configuration of Exposing Section]

Figure 2:
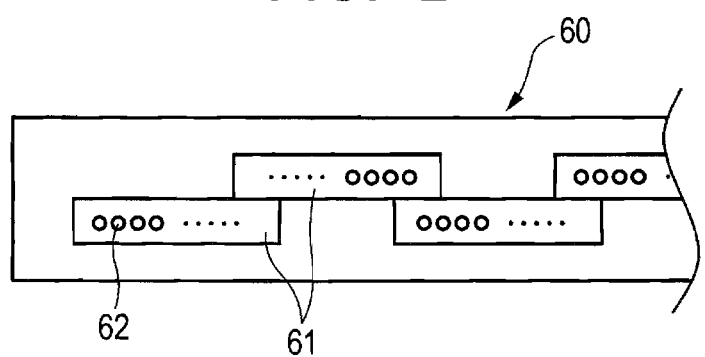
FIG. 2 is an explanatory diagram showing the schematic configuration of an exposing section.
Figure 3:
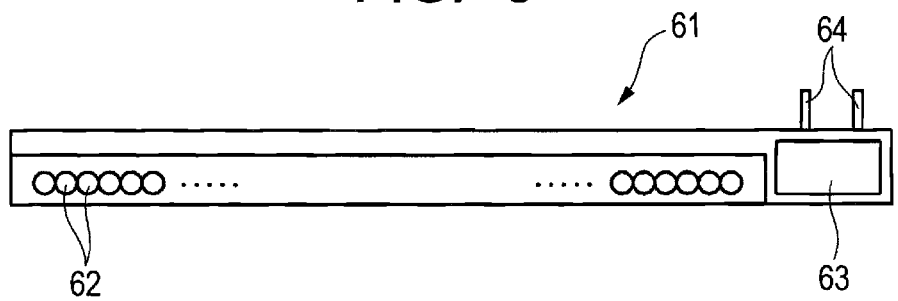
FIG. 3 is an explanatory diagram showing the schematic configuration of an LED unit.

Next, the exposing section 53 of the image forming section 10 will be described. The exposing section 53 includes a light emitting unit 60 having a plurality of light emitting elements that is arranged linearly. As shown in FIG. 2, the light emitting unit 60 of the MFP 100 is, for example, a bar-shaped member in which a plurality of LED units 61 is integrated. As shown in FIG. 3, in each LED unit 61, a plurality of LED elements 62 and a driving circuit 63 are integrally mounted. The plurality of LED elements 62 of the LED unit 61 is arranged along one straight line. Terminals 64 for receiving inputs of signals are connected with the driving circuit 63. The driving circuit 63 drives the LED elements 62 to emit light sequentially from one end side to the other end side.

As shown in FIG. 2, for example, each LED unit 61 of the light emitting unit 60 may be arranged in staggered arrangement along two rows parallel to the longitudinal direction of the light emitting unit 60. In this case, although the plurality of LED elements 62 is actually arranged along two straight lines, this arrangement is also an example of linear arrangement. The LED element 62 is an example of a light emitting element, and the LED unit 61 is an example of a light-emitting-element group.

Preferably, each LED unit 61 of the light emitting unit 60 is driven such that scanning directions are opposite between one row and the other row of the above-described two rows. If the scanning directions of the neighboring LED units 61 are opposite, and if there is no positional deviation between the LED units 61, the end points of scanning match at some parts. That is, whether the end points of scanning match can be used as one of criteria for determining whether there is positional deviation. In contrast, if the scanning direction of each LED unit 61 is the same, the end points of scanning do not match regardless of whether there is positional deviation. Hence, the end points of scanning cannot be used as a criterion for determining whether there is positional deviation.

In the MFP 100, the light emitting unit 60 is mounted such that its longitudinal direction is parallel to the axial direction of the photosensitive member 51. The respective LED elements 62 are turned on and off based on signals inputted from the terminals 64, so that the photosensitive member 51 is exposed one dot row in the axial direction at a time. Note that, in the light emitting unit 60 of the MFP 100, the plurality of LED units 61 is arranged such that no overlap or gap of the LED elements 62 is formed, in the longitudinal direction, between the LED units 61 arranged in two rows.

[Electrical Configuration of MFP]

Figure 4:
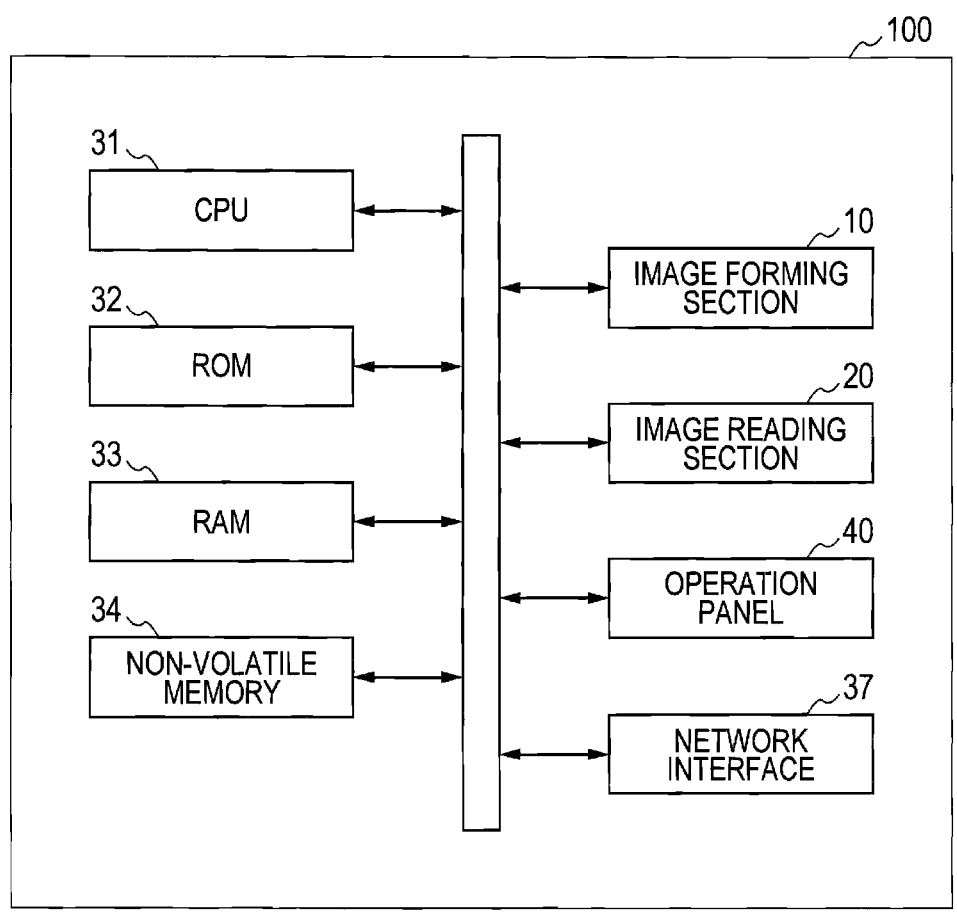
FIG. 4 is a block diagram showing the electrical configuration of the MFP.

Next, the electrical configuration of the MFP 100 will be described. As shown in FIG. 4, the MFP 100 includes a CPU 31, a ROM 32, a RAM 33, and a non-volatile memory 34. Further, the MFP 100 includes a network interface 37 that performs communication with an external device. The CPU 31 is electrically connected with the image forming section 10, the image reading section 20, the operation panel 40, and the network interface 37.

The ROM 32 stores various control programs for controlling the MFP 100, various settings, initial values, a first density-deviation correction pattern 71 and a second density-deviation correction pattern 72 described later, and the like. The RAM 33 is used as a work area from which the various control programs are read out, or as a storage area for keeping print data. The non-volatile memory 34 stores various setting values, an amount of density deviation described later, and the like. The CPU 31 runs the control programs read out from the ROM 32 while storing the processing results in the RAM 33 or in the non-volatile memory 34, thereby controlling the entirety of the MFP 100. The CPU 31 is an example of a processor.

[Density-Deviation Correction Pattern]

Next, the first density-deviation correction pattern 71 and the second density-deviation correction pattern 72 stored in the ROM 32 will be described. In the following descriptions, the first density-deviation correction pattern 71 and the second density-deviation correction pattern 72 are collectively referred to as the pattern 71, 72, unless the pattern 71, 72 need to be distinguished from each other.

Figure 5:
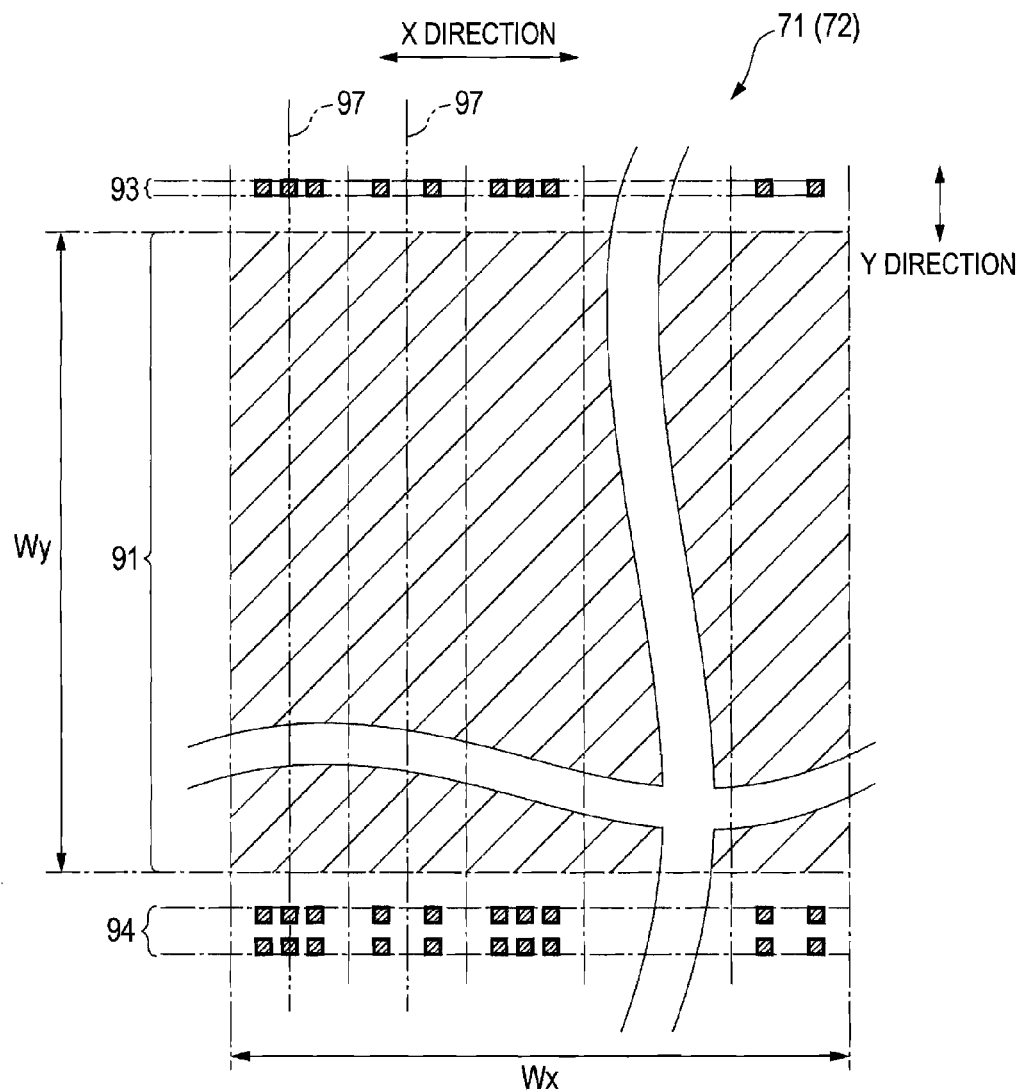
FIG. 5 is an explanatory diagram showing an example of a pattern for detecting density deviation.

As schematically shown in FIG. 5, for example, each of the patterns 71, 72 is print data including a pattern image 91 and mark images 93, 94. Of these, the pattern image 91 is an example of a pattern image for detecting density deviation, and is a solid image or a halftone image. The pattern image 91 of the first density-deviation correction pattern 71 and the pattern image 91 of the second density-deviation correction pattern 72 have different densities. Specifically, the pattern image 91 of the second density-deviation correction pattern 72 has a higher density than the pattern image 91 of the first density-deviation correction pattern 71. On the other hand, the mark images 93, 94 are an example of a mark image for detecting position (orientation). The same (common) mark images 93, 94 may be used for both the first density-deviation correction pattern 71 and the second density-deviation correction pattern 72.

In the following description, in each pattern 71, 72, Y direction is a direction in which the mark image 93, the pattern image 91, and the mark image 94 are arranged. Further, in each pattern 71, 72, X direction is a direction perpendicular to the Y direction. In FIG. 5, the Y direction is a vertical direction in the drawing. As will be described later, in the MFP 100, an image is printed on a sheet based on the pattern 71, 72 stored in the ROM 32. At the time of printing, the X direction of the pattern 71, 72 is oriented in the arrangement direction of the LED elements 62 in the LED unit 61. Also, the Y direction of the pattern 71, 72 is oriented in a direction perpendicular to the arrangement direction of the LED elements 62 in the LED unit 61. That is, the MFP 100 controls the image forming section 10 to print the pattern 71, 72 onto a sheet that is conveyed in the Y direction of the pattern 71, 72.

A length Wx of the pattern image 91 of the pattern 71, 72 in the X direction preferably corresponds to the entire exposure range of the light emitting unit 60. When the pattern 71, 72 of this length is printed, all the LED units 61 included in the light emitting unit 60 of the MFP 100 are used. Thus, density deviation can be detected for all the LED units 61. Further, preferably, a length Wy of the pattern image 91 in the Y direction is larger than or equal to the peripheral length of the photosensitive member 51. In this way, because the entire periphery of the photosensitive member 51 is used, effects due to cyclic fluctuations such as variances in rotations of the photosensitive member 51 can be reduced.

As dividedly indicated by the single-dot chain lines in FIG. 5, the pattern 71, 72 is divided, in the X direction, into a plurality of blocks each corresponding to the entire length occupied by the LED elements 62 of one LED unit 61 of the exposing section 53. As the blocks of the pattern 71, 72, for example, there are two types in which the mark images 93, 94 are different, and the two types of the blocks are arranged alternately. Note that, in FIG. 5, the single-dot chain lines shown as borders between the blocks are intended for description purposes, and are not included in print data.

The pattern image 91 of the second density-deviation correction pattern 72 is a solid image, for example. At the time of printing the solid image, all the LED elements 62 of all the LED units 61 are lighted, and all the dots in a printable range are printed.

On the other hand, the pattern image 91 of the first density-deviation correction pattern 71 is a halftone image that is print data in which print dots are partially thinned out from the solid image. The halftone image will be described later.

In order to perform highly accurate correction for forming a high-quality image, it is preferable to calculate the amount of density deviation by using a plurality of types of the patterns 71, 72. It is preferable to calculate the amount of density deviation at least for the second density-deviation correction pattern 72 including the pattern image 91 of a solid image and for the first density-deviation correction pattern 71 including the pattern image 91 of a halftone image. For example, different colors have different densities that are easy to recognize. Thus, by using a plurality of pattern images having different densities, a detection error is suppressed, and it is expected to calculate more accurate amount of density deviation.

The mark images 93, 94 of the pattern 71, 72 are arranged outside (at the both sides of) the pattern image 91 with respect to the Y direction, so as to interpose the pattern image 91 therebetween. For each block, the mark image 93 and the mark image 94 are located at the same position with respect to the X direction. With respect to the Y direction, for each block, the mark image 93 and the mark image 94 have different numbers of dots or have different sizes. Preferably, each of the mark images 93, 94 is a figure that is symmetrical with respect to a center line of each block (block axis 97 described later), with respect to the X direction. In the example of FIG. 5, the mark images 93, 94 are a plurality of dot data, and the number of dots is different depending on the block.

When the pattern 71, 72 is printed by the image forming section 10 in the orientation shown in FIG. 5, the entirety of each block is formed by using one LED unit 61. Hence, dots at the same position with respect to the X direction are formed by using one LED element 62 corresponding to that position. Accordingly, based on the mark images 93, 94 included in a sheet on which the pattern 71, 72 is printed, it is possible to obtain the arrangement direction of the LED elements 62 at printing, a range corresponding to each LED unit 61, the sheet conveying direction at printing, and the like. Note that the size of each dot of the mark images 93, 94 is several pixels, for example. The size may be a size that can be formed by the image forming section 10 and that can be read by the image reading section 20.

[Halftone Image]

Examples of the pattern image 91 of the first density-deviation correction pattern 71 are shown in FIGS. 6 through 9. In these figures, regions indicated by hatching are print data involving adhesion of toner, and blank regions between those hatched regions are not print data involving adhesion of toner. The ROM 32 of the MFP 100 stores one or more of these pattern images 91.

Figure 6:
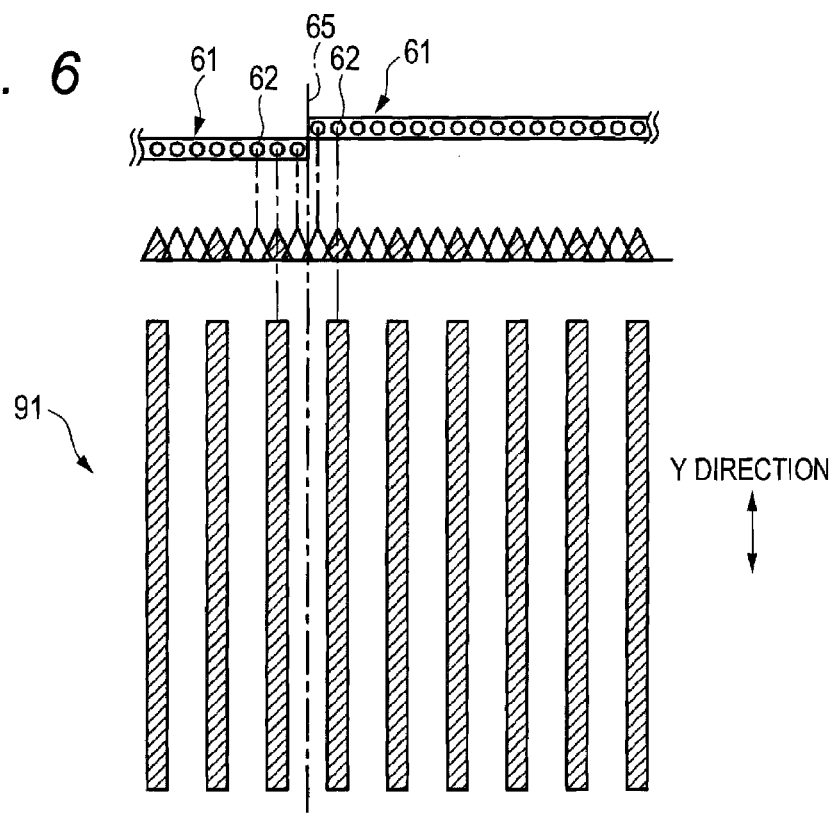
FIG. 6 is an explanatory diagram showing an example of a halftone image.
Figure 7:
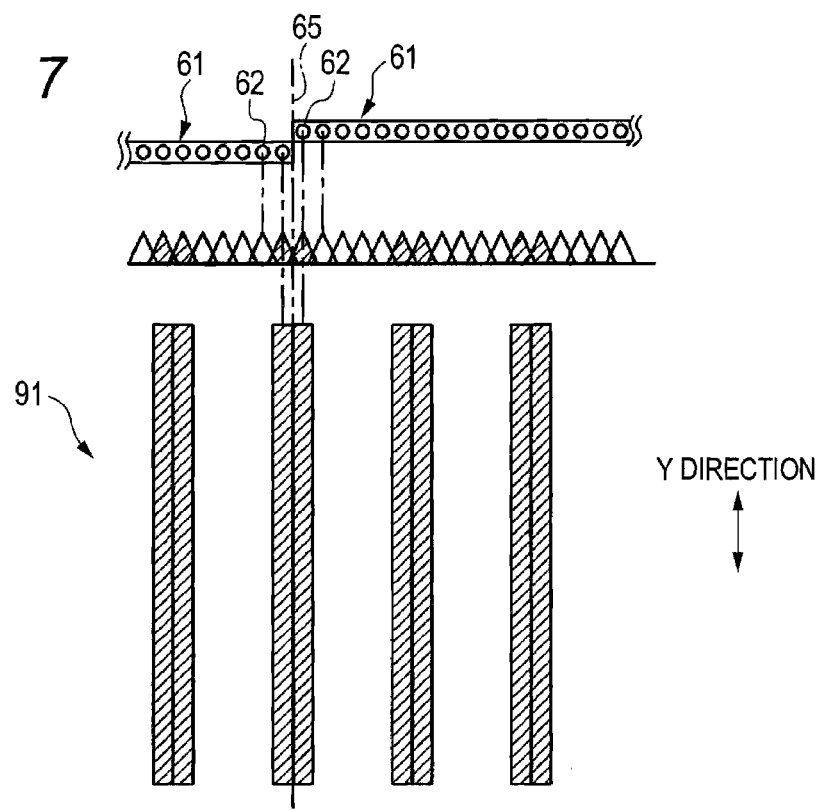
FIG. 7 is an explanatory diagram showing another example of a halftone image.

FIGS. 6 and 7 each shows so-called vertical-striped pattern having equally-spaced stripes. These pattern images 91 are linear patterns (straight-line patterns) parallel to the sheet conveying direction at the time of printing. FIGS. 6 and 7 show, at the upper side of the pattern image 91, the arrangement of the LED elements 62 of the corresponding LED units 61 and simplified optical paths of light emitted from each LED element 62. Further, a border 65 indicates a boundary between the neighboring LED units 61.

FIG. 6 shows the pattern image 91 that is formed by using the plurality of the LED elements 62 that do not include the LED elements 62 located at both ends of each LED unit 61. The lighted LED elements 62 include the LED elements 62 adjacent to the LED elements 62 located at the both ends of each LED unit 61, and are arranged in an equally-spaced manner.

In the pattern image 91 in FIG. 6, a region including the border 65 of the LED units 61 is not printed. Accordingly, if there are variances in intervals of the arrangement of the LED units 61, a difference arises in widths of regions that are not printed, and this appears as a difference between the density around the border 65 and the density in other parts. Accordingly, in order to perform correction of density deviation by using this pattern, the amount of light emission of the LED unit 61 is corrected based on the difference between the density around the border 65 and the density in other parts. Correction of the amount of light emission of the LED unit 61 will be described later in detail. Or, if the positions of printed linear patterns can be acquired, correction may be performed based on intervals between the linear patterns. For example, a distance between the linear patterns may be measured, and a difference between the distance and a theoretical value may be used to perform light amount correction.

FIG. 7 shows the pattern image 91 that is formed by using the plurality of the LED elements 62 that include the LED elements 62 located at both ends of each LED unit 61. The lighted LED elements 62 include the LED elements 62 located at the both ends of each LED unit 61, and are arranged in an equally-spaced manner. FIG. 7 shows an example in which neighboring two LED elements 62 are lighted, so as to print linear patterns (straight-line patterns) each having two-dot width.

In the pattern image 91 in FIG. 7, a linear pattern is printed in a region including the border 65 of the LED unit 61. Accordingly, if there are variances in intervals of the arrangement in the LED units 61, the width of the linear pattern located at the border 65 changes, and this appears as a difference between the density around the border 65 and the density in other parts. Accordingly, with this pattern, density deviation can be obtained from comparison between a width of the linear pattern at the border 65 and a width of the linear pattern at a part other than the border 65. Or, for example, if the amount of light of the LED element 62 adjacent to the border 65 is small, it sometimes happens that a white streak appears at the border 65. The amount of light emission of the LED unit 61 can be corrected based on a difference between the density around the border 65 and the density at other parts. If a white streak appears, the amount of light of the LED element 62 adjacent to the border 65 can be increased so that the white streak is less visible.

Figure 8:
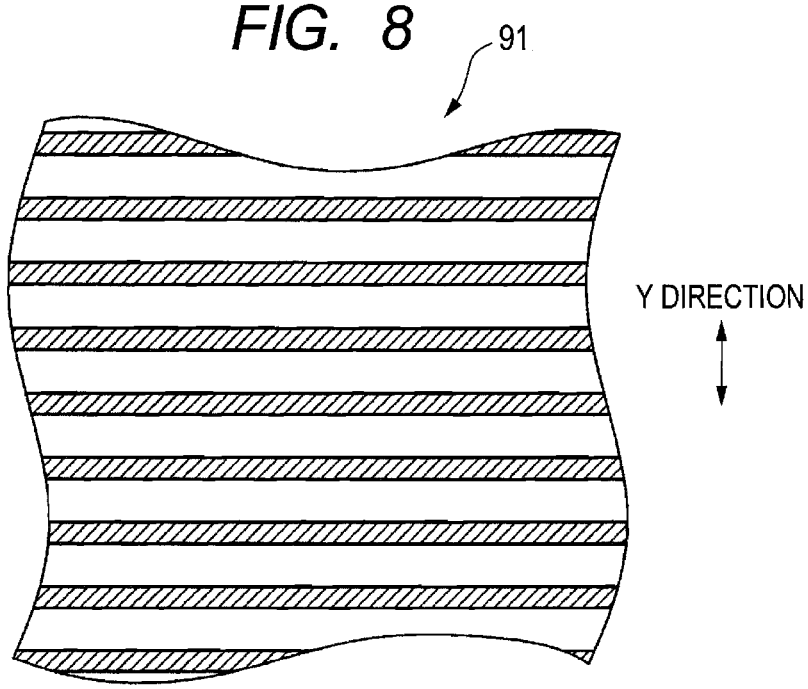
FIG. 8 is an explanatory diagram showing still another example of a halftone image.

FIG. 8 shows a so-called horizontal-striped pattern. The pattern image 91 in FIG. 8 includes linear patterns (straight-line patterns) parallel to the arrangement direction of the LED elements 62. That is, a horizontal line in which all dots are printed in the X direction is repeated in the Y direction with an interval between each other. This pattern is a pattern perpendicular to the sheet conveying direction at the time of printing. Hence, even if there is deviation of intervals between the LED units 61, the deviation is unlikely to appear as a difference of density. Accordingly, it is easy to check differences in the amount of light for each LED element 62, by eliminating effects of positional deviation. Further, in this pattern, because all the LED elements 62 of the LED unit 61 are lighted, variances in the amount of light of each LED element 62 in the LED unit 61 can be obtained.

Note that, when the amount of light emission of the LED elements 62 is corrected by using the pattern of FIG. 8, it is preferable to use an average value of density of each dot group having three dots (or more) including one LED element 62 and the LED elements 62 at both sides thereof. This is because actual light emission is not limited to a range of one dot of the LED element 62, but spreads in some width. Further, usage of the average value reduces effects due to variances in optical elements of the image sensor 22 of the image reading section 20.

Figure 9:
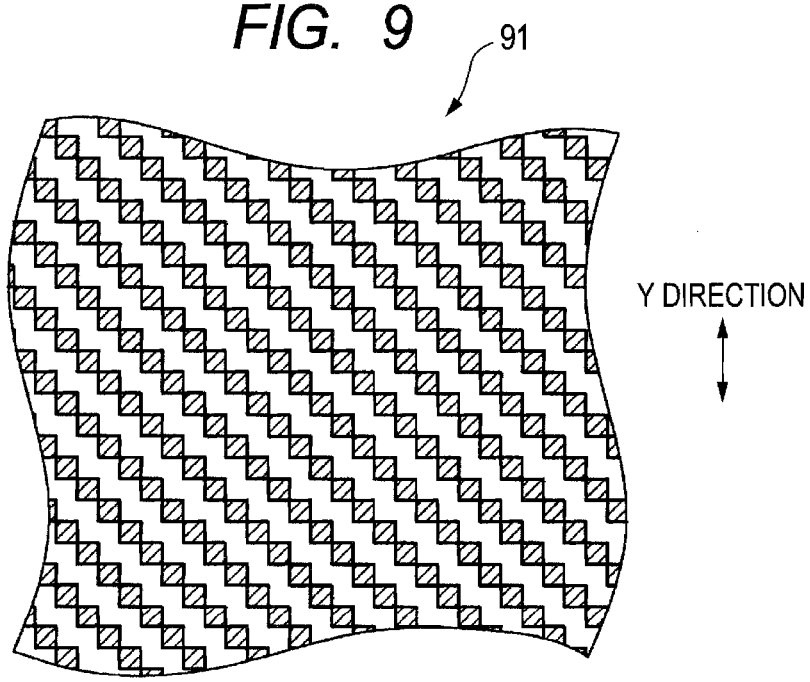
FIG. 9 is an explanatory diagram showing still another example of a halftone image.

FIG. 9 shows a pattern of diagonal lines. In the pattern image 91 in FIG. 9, an image (dot) formed by one LED element 62 does not adjoin images formed by adjacent LED elements 62 in the arrangement direction of the LED elements 62 or in a direction perpendicular to the arrangement direction of the LED elements 62. That is, each dot is isolated, and none of the LED elements 62 is lighted at the same time as the adjacent LED elements 62.

Because the pattern of FIG. 9 is less subject to the effects by the adjacent LED elements 62, differences in the amount of light of each LED element 62 are likely to appear in an image. That is, it is relatively easy to acquire the differences in the amount of light of each LED element 62. Thus, the pattern of FIG. 9 is suitable for performing correction of the amount of light emission for each LED element 62.

As described above, depending on data arrangement of the pattern 71, the type of density deviation that is easy to acquire is different. Further, factors that affect a calculation value of density deviation are also different depending on data arrangement of the pattern 71. Accordingly, when image quality is adjusted by using the pattern image 91, it is preferable to form at least the first density-deviation correction pattern 71 which has a lower density than a solid image, so as to clarify contrast of densities between a part where the pattern image 91 overlaps and a part where the pattern image 91 does not overlap.

[Density Deviation Correction]

As described above, the light emitting unit 60 of the MFP 100 has the plurality of LED units 61. Hence, differences may arise in resistance values of the wiring 17 among the LED units 61, due to effects of bending of the wiring 17 at the time of mounting the light emitting unit 60 on the MFP 100, or due to effects of environments etc. in which the wiring 17 is placed within the MFP 100. As a result of differences arising in the resistance values, differences arise in the amount of light emission among the LED units 61, and this appears as density deviation of an image. Thus, the MFP 100 executes a pattern reading process of, after assembly, controlling the image forming section 10 to print the pattern 71, 72 stored in the ROM 32 and controlling the image reading section 20 to read the pattern 71, 72, and a calculating process of calculating the amount of density deviation based on image data read in the pattern reading process. With these processes, the MFP 100 acquires the amount of density deviation for each LED unit 61, and stores the acquired amount of density deviation in the non-volatile memory 34.

And, at the time of image formation, the MFP 100 adjusts the amount of light emission of the LED elements 62 of each LED unit 61, based on the stored amount of density deviation (that is, the LED unit 61 is a unit of adjustment of the amount of light emission). In this way, the MFP 100 suppresses effects due to density deviation of each LED unit 61, thereby acquiring an image with little unevenness. Compared with a degree of density deviation among the plurality of LED units 61, a degree of density deviation among the LED elements 62 within each LED unit 61 is small.

[Density-Deviation-Amount Acquiring Process]
[First Embodiment]

Next, a density-deviation-amount acquiring process for acquiring the amount of density deviation among each LED unit 61 of the MFP 100 will be described while referring to the flowchart of FIG. 10. This process is executed by the CPU 31, triggered by reception of an input of an updating instruction of correction values by a user's operation on the operation panel 40. For example, this process is executed at the final stage of a manufacture inspection process of the MFP 100, and the user here is an administrator of manufacture, for example.

Upon starting the density-deviation-amount acquiring process, the CPU 31 of the MFP 100 first controls the image reading section 20 to start a calibration process of the image sensor 22 (S101). This calibration process is a process for correcting brightness and distortion of the image sensor 22 of the image reading section 20. The calibration process requires a certain period of time. Thus, by performing the calibration process in parallel with a pattern writing process (pattern forming process) described later, a processing time of the entire density-deviation-amount acquiring process can be shortened.

While the image reading section 20 performs the calibration process of the image sensor 22, the CPU 31 of the MFP 100 controls the image forming section 10 to perform bias correction in parallel with the calibration process (S102). This process is, for example, a process of forming a toner image of a test patch for correction, transferring the test patch onto the conveying belt 7, and reading the transferred test patch with the sensor 57 (see FIG. 1), thereby performing adjustments of developing bias, and the like. By performing this bias correction prior to printing, generation of blur and bleeding in a printed pattern image can be prevented.

Subsequent to the bias correction, the CPU 31 of the MFP 100 determines whether acquisition of the amount of density deviation for high image quality is instructed (S103). For example, if this is the first execution of the density-deviation-amount acquiring process after manufacture, it is determined that acquisition of the amount of density deviation for high image quality is instructed. If it is determined that acquisition of the amount of density deviation for high image quality is instructed (S103: Yes), the CPU 31 controls the image forming section 10 to form (write) the second density-deviation correction pattern 72 on a sheet (S104). Further, the CPU 31 controls the image forming section 10 to form the first density-deviation correction pattern 71 on the sheet (S105).

That is, the MFP 100 conveys a sheet, and prints images based on the first density-deviation correction pattern 71 and the second density-deviation correction pattern 72 on the sheet. Both patterns may be printed on one sheet, or the patterns 71, 72 may be printed on respective ones of two sheets. The patterns 71, 72 are print data stored in the ROM 32. The CPU 31 reads out the patterns 71, 72 from the ROM 32, and controls the image forming section 10 to print the images. Note that, at the time of the printing, it is preferable not to perform a positional-deviation correcting process at the MFP 100 main body side, such as skew correction, for example. With this setting, density deviation, positional deviation, etc. of the LED unit 61 itself appear in an image as it is.

On the other hand, if it is determined that acquisition of the amount of density deviation for high image quality is not instructed (S103: No), the CPU 31 controls the image forming section 10 to form the first density-deviation correction pattern 71 on the sheet (S105). That is, the second density-deviation correction pattern 72 is not formed. This reduces the amount of toner and the number of sheets consumed for density deviation correction.

The type of density deviation that is likely to appear differs, depending on which of the halftone images illustrated in FIGS. 6 through 9 is used as the first density-deviation correction pattern 71. Thus, it is desirable to select and use a suitable pattern, depending on the usage. Further, if highly accurate correction is required, a plurality of kinds of halftone images may be formed on a sheet(s).

For example, if the pattern image 91 shown in FIG. 6 or 7 is used, positional deviation in the arrangement direction of the LED elements 62 can be recognized in detail. Or, for example, if the pattern image 91 shown in FIG. 8 is used, a difference in the amount of light of each LED element 62 can be recognized in detail. Further, if the pattern image 91 shown in FIG. 9 is used, both the positional deviation in the arrangement direction of the LED elements 62 and the difference in the amount of light of each LED element 62 can be recognized moderately. Note that, if only one pattern image 91 is selected from these examples, the pattern image 91 shown in FIG. 9 is preferable.

Further, when correction is performed for the LED unit 61 in the processing section 5 using yellow toner, it is preferable to form the second density-deviation correction pattern 72 instead of the first density-deviation correction pattern 71. A yellow pattern printed on a sheet is difficult to be read by the image reading section 20, and is difficult to be recognized as density difference.

In the pattern writing process of S104, S105, the pattern 71, 72 is printed in such an orientation that the mark images 93, 94 are arranged at the upstream side and at the downstream side of the pattern image 91 with respect to the sheet conveying direction. That is, the sheet conveying direction in the pattern writing process is the Y direction of the pattern 71, 72. Further, the arrangement direction of the LED elements 62 at the time of printing is the X direction of the pattern 71, 72. Accordingly, the mark image 93 and the mark image 94 in the same block are formed by using the same LED elements 62.

Then, the CPU 31 of the MFP 100 determines whether the calibration process of the image sensor 22 started in S101 is finished (S106). If it is determined that the calibration process is not finished (S106: No), the CPU 31 waits until the calibration process is finished. If the calibration process of the image sensor 22 is finished (S106: Yes), the MFP 100 notifies the user to start reading (S107). Specifically, the CPU 31 notifies the user by controlling, for example, the operation panel 40 to display a message to set, on the image reading section 20, the sheet on which the pattern 71, 72 is formed in S104, S105 and to press a button for starting reading.

Further, the CPU 31 determines whether an instruction for starting reading of the sheet is received (S108). If the instruction for starting reading of the sheet is not received (S108: No), the CPU 31 waits until the instruction is received. If the instruction for starting reading is received (S108: Yes), the CPU 31 executes a pattern reading process (S109).

Next, steps of the pattern reading process will be described while referring to the flowchart of FIG. 11. This process is started in a state where a sheet on which the pattern 71, 72 is formed in S104, S105 of FIG. 10 is set in the image reading section 20 of the MFP 100.

Upon starting this process, the CPU 31 of the MFP 100 first controls the image reading section 20 to read an image on the sheet (S201). The reading method may be a method of moving the image sensor 22 or may be a method of moving the sheet. Further, the CPU 31 determines whether reading of the image on the sheet is completed (S202). If it is determined that reading of the image on the sheet is not completed (S202: No), reading is continued until reading is completed.

If it is determined that reading of the image on the sheet is completed (S202: Yes), the MFP 100 detects the mark images 93, 94 from the read image data, and acquires position coordinates of the detected mark images 93, 94 (S203). The line connecting the mark images 93, 94 denotes the sheet conveying direction at the time of forming the images. In S203, all the mark images 93, 94 may be extracted, or only a pair of mark images 93, 94 formed in the center part of the sheet may be extracted. Then, the CPU 31 determines whether the mark images 93, 94 are detected normally (S204).

If it is determined that the mark images 93, 94 are not detected normally (S204: No), a reading error is notified (S205). This is a case, for example, in which a sheet is read on which the pattern 71, 72 is not printed. Subsequent to S205, the CPU 31 deletes the read image data (S206), and returns to the density-deviation-amount acquiring process in FIG. 10.

On the other hand, if it is determined that the mark images 93, 94 are acquired normally (S204: Yes), the pattern reading process is completed normally, and the process returns to the density-deviation-amount acquiring process in FIG. 10. In some cases, in the read image data, the positional relationship between the mark image 93 and the mark image 94 is opposite from the positional relationship at the time when the mark images 93, 94 are printed. This is a case in which the sheet is set on the contact glass 23 in a state where the sheet is rotated approximately 180 degrees from the sheet conveying direction at the time of printing. In this case, too, it may be determined that the pattern reading process is completed normally and, when a calculation result in a deviation calculating process described later is applied, the sequence of the LED units 61 and the LED elements 62 may be changed.

Figure 10:
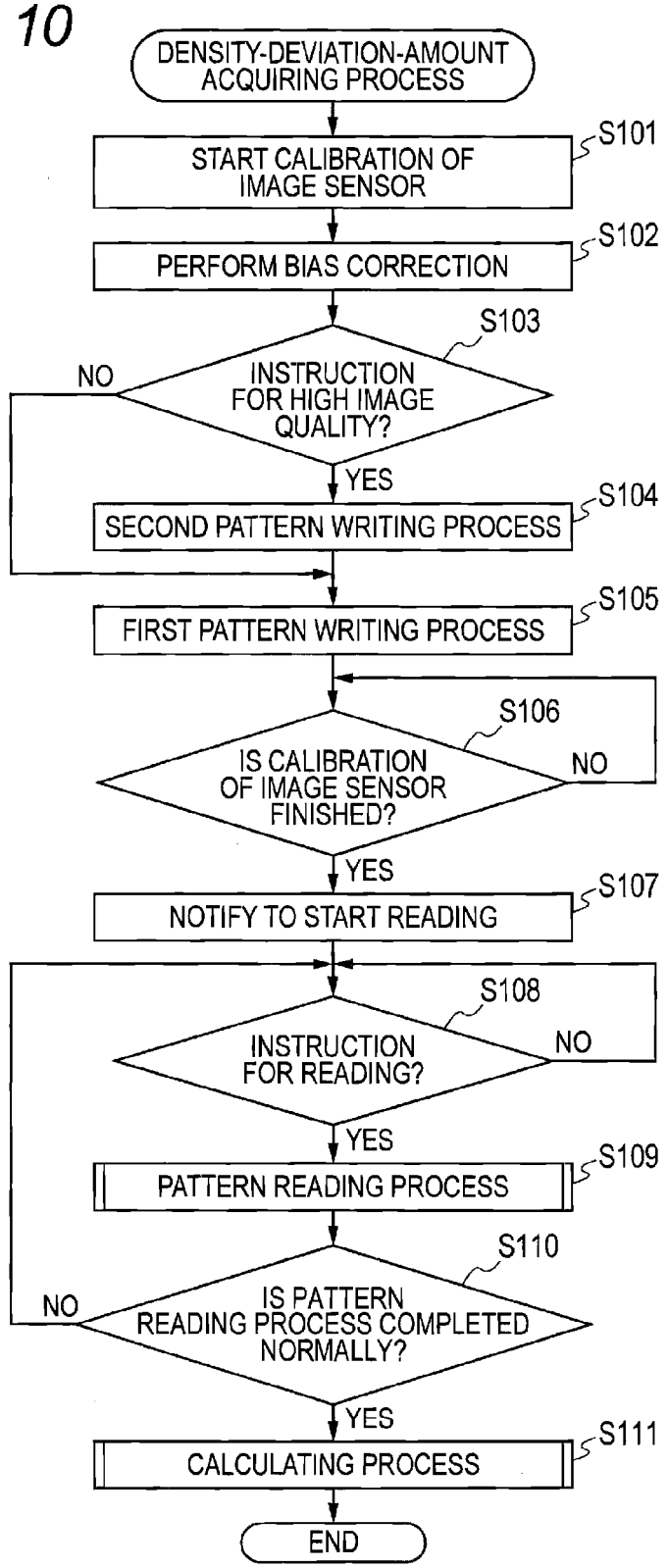
FIG. 10 is a flowchart showing the steps of a density-deviation-amount acquiring process.
Figure 11:
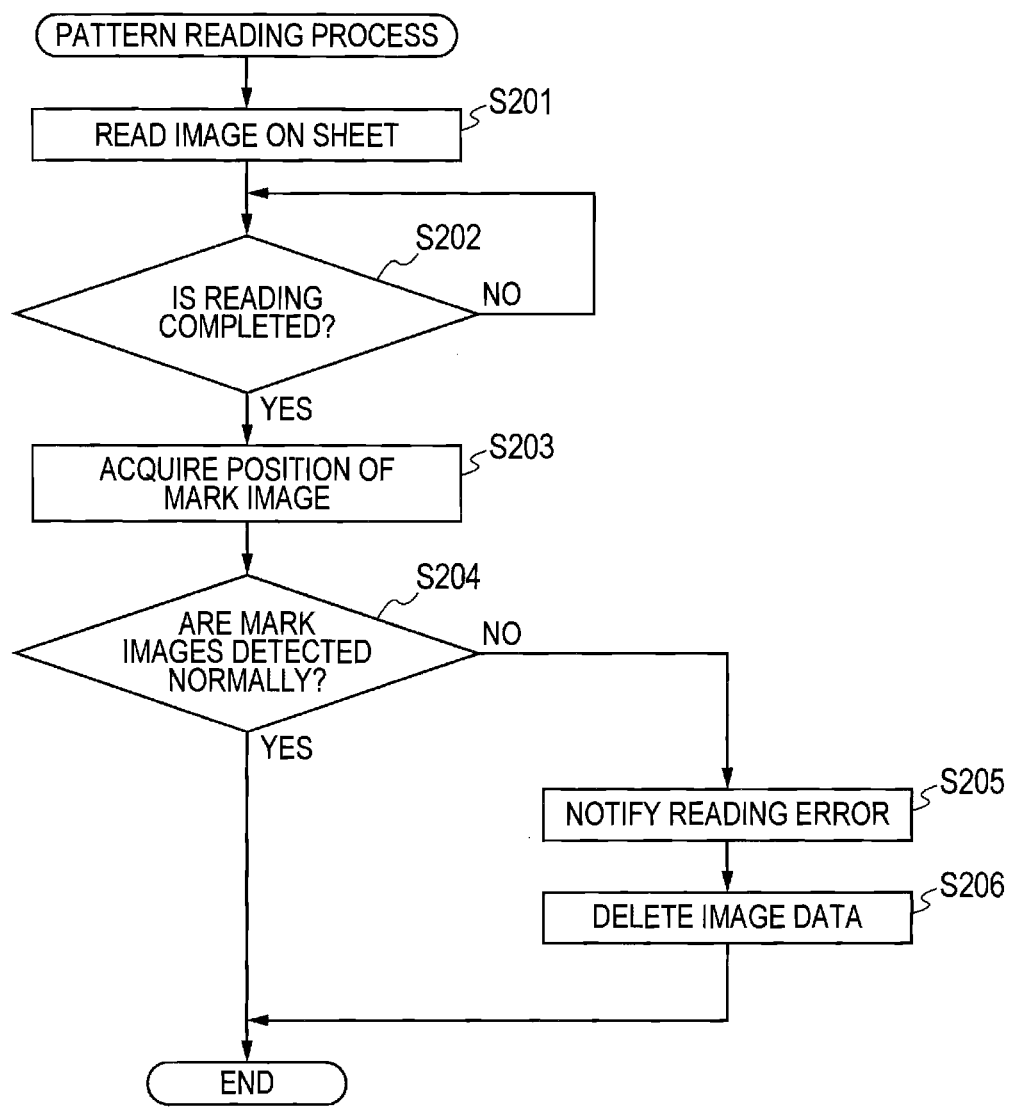
FIG. 11 is a flowchart showing the steps of a pattern reading process.

Returning to the density-deviation-amount acquiring process in FIG. 10, the CPU 31 determines whether the pattern reading process is completed normally in S109 (S110). That is, if image data is stored in the RAM 33, it is determined that the pattern reading process is completed normally (S110: Yes). On the other hand, if the process is returned from S206 in FIG. 11, that is, if no image data is stored in the RAM 33, the pattern reading process is not completed normally (S110: No). Hence, the CPU 31 returns to S108, and waits until a reading instruction is received again.

Figure 12:
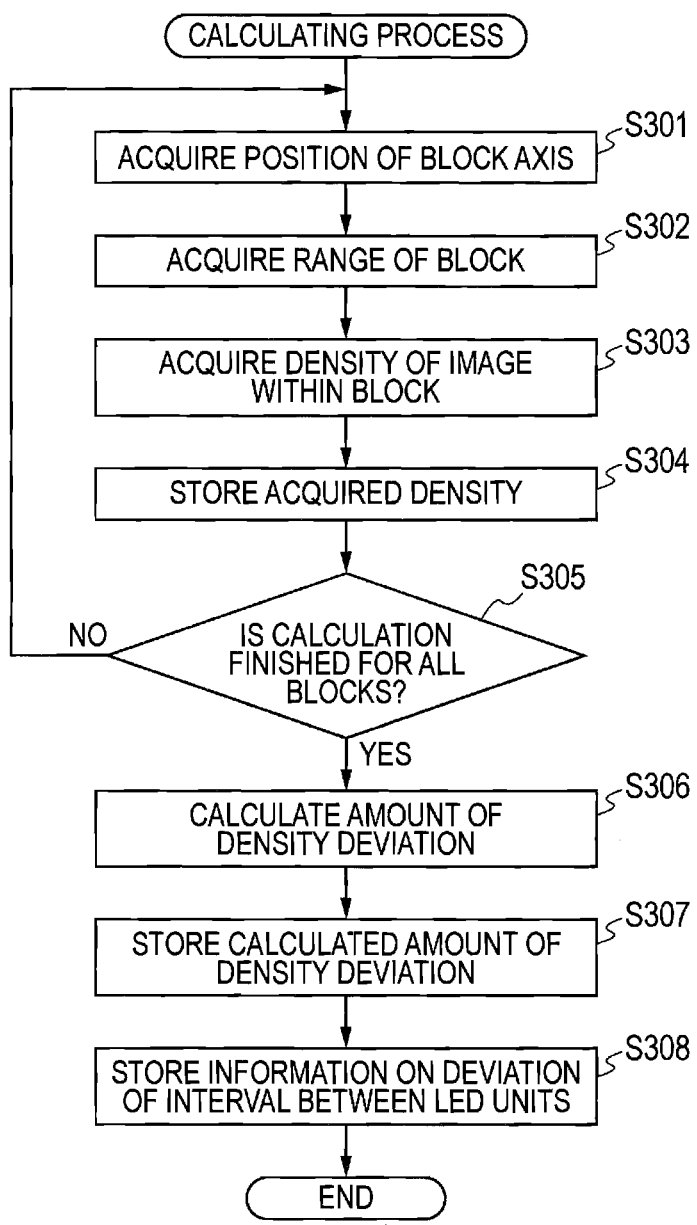
FIG. 12 is a flowchart showing the steps of a calculating process.

If it is determined that the pattern reading process is completed normally (S110: Yes), the CPU 31 executes the calculating process (S111). The steps of the calculating process executed in S111 will be described while referring to the flowchart of FIG. 12. This process is a process for calculating the amounts of density deviation of the LED units 61, based on image data read in the pattern reading process.

First, the CPU 31 of the MFP 100 acquires coordinates of each of the mark images 93, 94, and acquires the position of the block axis 97 (S301). The block axis 97 is the center line, for each block, that connects the center position of the mark image 93 in the main scanning direction and the center position of the mark image 94 in the main scanning direction.

For example, by regarding the mark image 93 within a predetermined range as one group, the CPU 31 calculates the average position of the mark image 93 in the group. Similarly, by regarding the mark image 94 within a predetermined range as one group, the CPU 31 calculates the average position of the mark image 94 in the group. Then, the CPU 31 acquires, as the block axis 97, a straight line connecting the average position of the mark image 93 and the average position of the mark image 94 corresponding to that mark image 93.

Then, the CPU 31 reads out image data within a range of a predetermined width measured from the block axis 97, and extracts the range of the pattern image 91 from the image data, thereby defining a block (S302). That is, a predetermined range measured from the block axis 97 in the main scanning direction is regarded as one block, and this block is associated with the corresponding LED unit 61. Further, the CPU 31 acquires image density within the extracted block (that is, an average density within the block) (S303). Then, the CPU 31 stores the acquired image density for each block in the RAM 33 (S304). By calculating image density for one block at a time, an excessive burden on the CPU 31 can be suppressed, compared with a case in which all the image data are processed at a time.

Further, the CPU 31 determines whether acquisition of image density is finished for all the blocks of the read image data (S305). If it is determined that the acquisition is not finished (S305: No), the CPU 31 returns to S301 and performs calculation for the next block in a similar manner (S301 through S304). Because each block corresponds to one of the LED units 61, the CPU 31 repeats the steps S301 through S304 by the number of times corresponding to the number of the LED units 61 included in the light emitting unit 60 of the exposing section 53.

If it is determined that calculation is finished for all the blocks (S305: Yes), the CPU 31 calculates a difference between a value stored in S304 and an aggregate average density which is the average for all the blocks, that is, the amount of density deviation (S306). Further, the CPU 31 stores the amount of density deviation calculated in S306 in the non-volatile memory 34 (S307). In this way, the difference between the average density of each block and the aggregate average density of the entire pattern image is calculated, which improves reliability of the calculated amount of density deviation. Here, the amount of density deviation is not limited to the difference between the value stored in S304 and the aggregate average density, but may be a density difference between neighboring blocks.

Further, the CPU 31 stores a degree of deviation of intervals among the LED units 61 in the non-volatile memory 34 (S308). For example, the CPU 31 determines whether a vertical stripe having different density from other parts appears at a border of the blocks and, if such a vertical stripe appears, stores the information. The information of the vertical stripe preferably includes at least information of the LED unit 61 corresponding to the position of the vertical stripe, and information of whether density of the vertical stripe is higher or lower than density of other parts. For example, if the interval between the LED units 61 is small, the interval between the LED elements 62 at ends of the both LED units 61 is small, and there is larger overlap between the optical paths, which leads to an image having a high density (thick image). In contrast, if the interval between the LED units 61 is large, there is smaller overlap between the optical paths, which leads to an image having a low density (thin image). Then, the calculating process ends. And, the process returns to FIG. 10, and the density-deviation-amount acquiring process ends.

[Second Embodiment]

Figure 13:
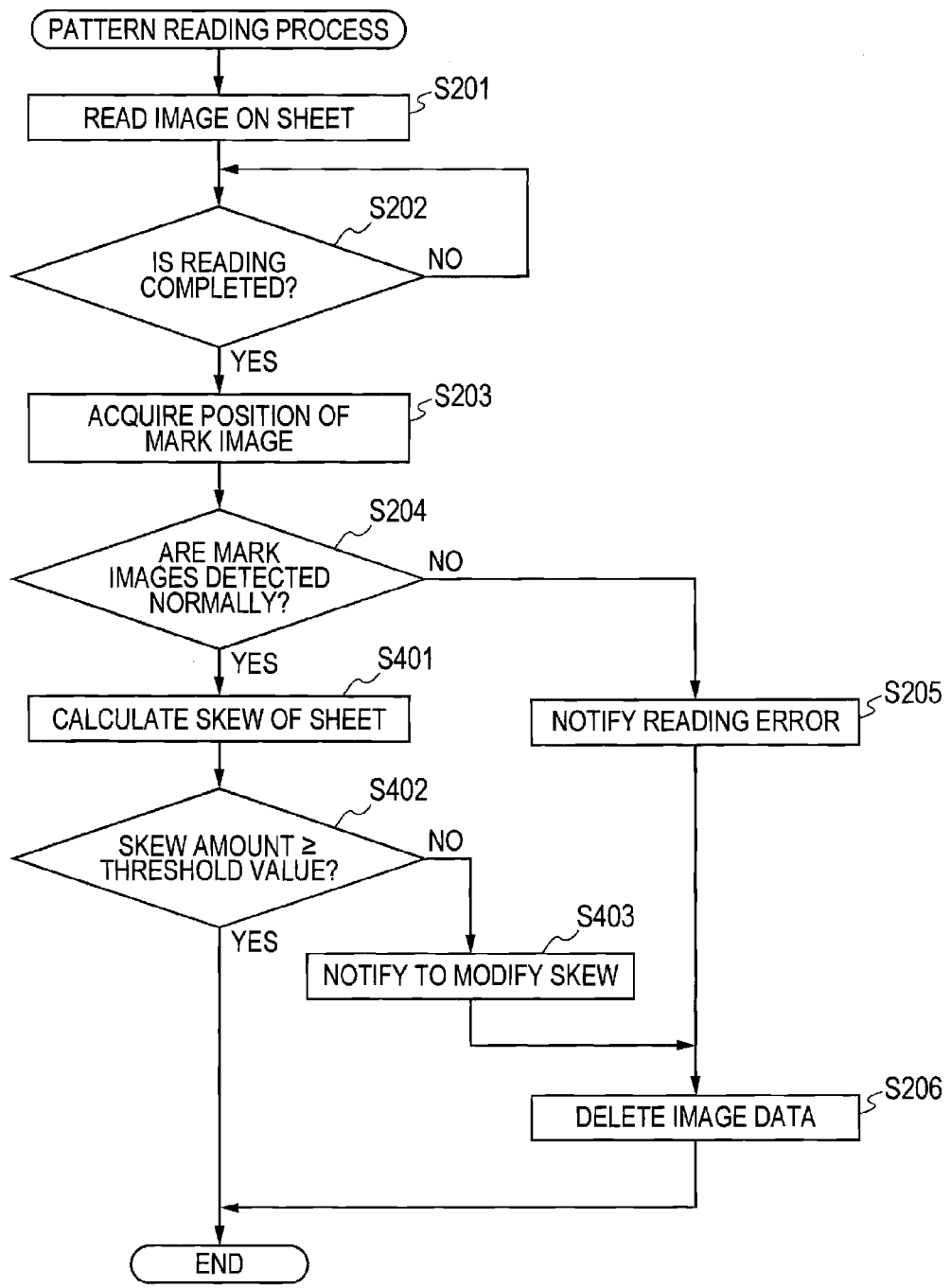
FIG. 13 is a flowchart showing the steps of a pattern reading process according to a second embodiment.

Next, a density-deviation-amount acquiring process according to a second embodiment will be described while referring to the flowchart of FIG. 13. In the density-deviation-amount acquiring process of the second embodiment, the pattern reading process of the first embodiment shown in FIG. 11 is replaced with a pattern reading process shown in FIG. 13. The processes other than the pattern reading process are the same as those in the first embodiment. Specifically, in the pattern reading process, reading is performed in a state where a sheet is skewed (inclined). In this regard, the second embodiment differs from the first embodiment in which a sheet is not skewed. Here, in the density-deviation-amount acquiring process of the second embodiment, the same processes as those in the first embodiment are designated by the same reference numerals to avoid duplicating description. That is, only the pattern reading process will be described.

The process advances from S108 in FIG. 10 to FIG. 13, and execution of the pattern reading process is started. The MFP 100 first controls the image reading section 20 to read an image on a sheet, and continues reading until the reading is completed (S201-S202). In the present embodiment, the reading method is preferably a method of moving the image sensor 22. That is, an image on a sheet placed on the contact glass 23 is read by moving the image sensor 22.

If it is determined that reading of the image on the sheet is completed (S202: Yes), the CPU 31 of the MFP 100 detects the mark images 93, 94 from the read image data (S203), and determines whether the mark images 93, 94 are detected normally (S204). If it is determined that the mark images 93, 94 are not detected normally (S204: No), a reading error is notified (S205), and the image data is deleted (S206). Then, the process returns to the density-deviation-amount acquiring process in FIG. 10.

In contrast, if it is determined that the mark images 93, 94 are acquired normally (S204: Yes), the CPU 31 calculates skew of the sub-scanning direction at the reading process relative to the sheet conveying direction at the writing process, based on relative positional relationship between the corresponding mark images 93 and 94 (S401).

If the sheet conveying direction at the time of writing (image formation) matches the sub-scanning direction at the time of reading, all the dot images formed by one LED element 62 are read by the same optical element in the image sensor 22. In the present embodiment, reading is performed while a sheet is skewed slightly within a sheet surface, so that the main scanning direction at the time of reading does not match the arrangement direction of the LED elements 62 at the time of image formation. For example, it is preferable that the sheet is skewed approximately one to five degrees (1-5°). Then, even if there are variances in optical elements of the image sensor 22 in the image reading section 20, effects of the variances in the optical elements are distributed. Thus, it is expected that effects of the variances in the optical elements are reduced.

Thus, the CPU 31 performs a determining process of determining whether the skew amount of the sheet calculated in S204 is larger than or equal to a predetermined threshold value (S402). Or, it may be determined whether the skew amount is within an appropriate range. This is because it is not preferable that the skew amount is too large. If it is determined that the skew amount is appropriate (S402: Yes), the pattern reading process is finished normally.

On the other hand, if it is determined that the skew amount is not appropriate (S402: No), it is preferable to again perform the pattern reading process so that the skew amount falls within the appropriate range. For example, the CPU 31 controls the operation panel 40 to display a screen for notifying the user to perform reading in a state where the sheet is skewed by a larger angle because the degree of skew is insufficient (S403). Further, the CPU 31 deletes the image data read in S201 (S206), and returns to the density-deviation-amount acquiring process in FIG. 10.

That is, in the second embodiment, if it is determined in S402 that the sheet read in the pattern reading process is not skewed by an amount (angle) that is larger than or equal to the threshold value relative to the sub-scanning direction at the time of reading, no deviation amount is calculated based on the read image data. Or, in a modification, even if a deviation amount is calculated, the calculated deviation amount is nullified.

Also, in S110 of FIG. 10, if the skew of the sheet is insufficient, it is determined that the pattern reading process is not completed normally (S110: No). In the case of No in S402 in FIG. 13, it is determined that the pattern reading process is not completed normally because no image data is stored in the RAM 33, and the process returns to S108.

In the present embodiment, the image data is read in a state where the sheet is skewed by an amount (angle) larger than or equal to the threshold value. Hence, the image data read in a skewed state in the pattern reading process is corrected to be a straight position, and the calculating process (FIG. 12) is performed for the image data subsequent to the correction. Or, the process may be performed for image data in a skewed state, and subsequently the skew may be corrected.

In the present embodiment, the pattern reading process is performed by moving the image sensor 22. However, reading may be performed by using an ADF, if a sheet can be moved in a state where the sheet is skewed appropriately.

[Image Forming Process]

Next, a density-deviation correcting process at image formation in the MFP 100 will be described. In the MFP 100 in which the density-deviation-amount acquiring process is executed, the difference between a density value for each block and the aggregate average density, that is, the amount of density deviation is stored in the non-volatile memory 34 in the calculating process. And, when an image forming process is performed in the MFP 100, the density-deviation correcting process is performed by using the stored amount of density deviation.

In the density-deviation correcting process, for example, the amount of light emission for each LED unit 61 is adjusted based on the amount of density deviation. Specifically, if the amount of density deviation is a negative value, the amount of light emission of the corresponding LED unit 61 is increased. If the amount of density deviation is a positive value, the amount of light emission of the corresponding LED unit 61 is decreased.

Further, if the non-volatile memory 34 stores a degree of deviation of the interval between the LED units 61, correction is performed by using that information. For example, if an interval between the LED elements 62 at both sides of the border 65 of the LED units 61 is small, and thus density around the border 65 is high, the amounts of light of the LED elements 62 of the LED units 61 at both sides of the border 65 are decreased. In contrast, if an interval between the LED elements 62 at both sides of the border 65 of the LED units 61 is large, and thus density around the border 65 is low, the amounts of light of the LED elements 62 of the LED units 61 at both sides of the border 65 are increased. Note that deviations of the amounts of light of the LED elements 62 within each LED unit 61 are preliminarily detected for adjustments, before the light emitting unit 60 is mounted (assembled) on the MFP 100.

As described above in detail, the MFP 100 of the present embodiment includes the image forming section 10 and the image reading section 20. The image forming section 10 includes the photosensitive member 51 and the exposing section 53 having the plurality of LED units 61. The image forming section 10 forms, on a sheet, the pattern image 91 for detecting density deviation of the LED unit 61, the image reading section 20 reads the sheet, and the amount of density deviation of each LED unit 61 is calculated based on the reading result. The pattern image 91 for detecting density deviation is formed on a sheet by using the light emitting unit 60 mounted on the MFP 100. That is, at the time of forming the pattern image 91 on the sheet, each LED unit 61 of the light emitting unit 60 is in a connected state using the wiring 17 and the like. Hence, the pattern image 91 for detecting density deviation formed on the sheet includes deviation of resistance values caused by mounting (assembly) of the light emitting unit 60. That is, the pattern image 91 reflects the state of the light emitting unit 60. Accordingly, by reading the pattern image 91 for detecting density deviation and by calculating the amount of density deviation, the amount of density deviation in a mounted (assembled) state on the MFP 100 can be obtained. Accordingly, correction values reflecting density deviation caused by mounting can be acquired.

While the invention has been described in detail with reference to the above aspects thereof, it would be apparent to those skilled in the art that various changes and modifications may be made therein without departing from the scope of the claims.

For example, as well as an MFP, the invention can be applied to an apparatus such as a copier, a facsimile apparatus, etc. as long as the apparatus has both an image forming function and an image reading function.

For example, in the above-described embodiment, the LED unit 61 having the LED elements 62 and the driving circuit 63 is illustrated. However, it is also possible to use a light-emitting-element group having only an array of LED elements 62 to which an external driving circuit is attached.

For example, in the above-described embodiment, the difference between the density of each LED unit 61 and the aggregate average density is obtained as the amount of density deviation. However, predetermined master data is preliminarily stored as a target for comparison. For example, a difference between the density of each LED unit 61 and the master data may be obtained as the amount of density deviation. Further, for example, it is possible to determine whether the MFP 100 is good or bad, based on the calculated amount of density deviation.

For example, if an MFP further has a configuration for passing, to the image reading section 20, a sheet on which the pattern 71, 72 is formed by the image forming section 10, the MFP is capable of automatically performing all the steps from formation of the patterns to calculation of the amount of density deviation, which is preferable.

For example, a person who executes the density-deviation-amount acquiring process is not limited to an administrator of manufacture. For example, the density-deviation-amount acquiring process may be performed on the MFP 100 after the MFP 100 is sold, at the time when a service person etc. performs a maintenance and inspection service. For example, when the light emitting unit 60 is replaced, it is preferable to execute the density-deviation-amount acquiring process. Also, the density-deviation-amount acquiring process may be executed when an end user replaces the light emitting unit 60.

For example, the invention may be applied to a combination of an LED-type printer not having an image reading section and a reading device such as a scanner etc. having an image reading section. For example, a pattern image for detecting density deviation of an LED unit is formed on a sheet by the printer, and the sheet is read by the reading device. Based on the reading result, the amount of density deviation of the LED unit of the printer may be calculated. And, the calculated amount of density deviation may be stored in the printer.

The processes disclosed in the embodiment may be executed by hardware such as a single CPU, a plurality of CPUs, an ASIC etc., or a combination thereof. Further, the processes disclosed in the embodiment may be realized in various modes such as a recording medium storing program instructions for executing the processes, a method of executing the processes, and the like.

What is claimed is:

1. An image processing device comprising:
   an image forming section comprising:
      a bearing member configured to bear an image; and
      a plurality of light-emitting-element groups each having a plurality of light emitting elements arranged linearly in an arrangement direction, the image forming section being configured to form an image on the bearing member by using the plurality of light-emitting-element groups to transfer the image on a sheet;
   a reader configured to read an image on a sheet;
   a processor; and
   a memory storing instructions, the instructions, when executed by the processor, causing the processor to perform:
      a pattern writing process of controlling the image forming section to form a pattern image on the sheet by using the plurality of light-emitting-element groups such that a length of the pattern image in the arrangement direction corresponds to an entire exposure range of the plurality of light-emitting-element groups, the pattern image being an image for detecting density deviation;
      a pattern reading process of controlling the reader to read the pattern image formed on the sheet by the pattern writing process; and
      a calculating process of calculating an amount of density deviation of each of the plurality of light-emitting-element groups based on a reading result by the pattern reading process, each of the plurality of light-emitting-element groups being a unit of calculation of the amount of density deviation.

2. The image processing device according to claim 1, wherein the processor is configured to perform:
   a determining process of determining whether the sheet read in the pattern reading process is skewed by an amount larger than or equal to a threshold value relative to a sub-scanning direction of the reader; and
   a nullifying process of nullifying the amount of density deviation calculated in the calculating process, in response to determination in the determining process that the sheet read in the pattern reading process is not skewed by an amount larger than or equal to the threshold value.

3. The image processing device according to claim 1, wherein the processor is configured to perform an adjusting process of adjusting an amount of light of the plurality of light emitting elements, based on the amount of density deviation calculated in the calculating process.

4. The image processing device according to claim 1, wherein the processor is configured to perform a dividing process of dividing image data read in the pattern reading process into a plurality of blocks such that the plurality of light-emitting-element groups and the plurality of blocks are in one-to-one correspondence; and
   wherein the processor is configured to, in the calculating process, calculate the amount of density deviation based on density of an image in each of the plurality of blocks.

5. The image processing device according to claim 4, wherein the processor is configured to, in the calculating process, calculate an average density of the image in each of the plurality of blocks.

6. The image processing device according to claim 1,
wherein the processor is configured to, in the calculating process, calculate the amount of density deviation based on a difference between a density of the pattern image read in the pattern reading process and an average density of all region of the pattern image.

7. The image processing device according to claim 1,
wherein the image forming section comprises a conveyer configured to convey a sheet in a sheet conveying direction.

8. The image processing device according to claim 7,
wherein the processor is configured to, in the pattern writing process, control the image forming section to form the pattern image of a length greater than or equal to a peripheral length of the bearing member in the sheet conveying direction.

9. The image processing device according to claim 7,
wherein the processor is configured to, in the pattern writing process, control the image forming section to form mark images for position recognition on the sheet on which the pattern image is formed, the mark images being formed by using a same light emitting element as the pattern image and located at an upstream side and a downstream side of the pattern image in the sheet conveying direction so that the pattern image is interposed between the mark images.

10. The image processing device according to claim 9,
wherein the processor is configured to perform a dividing process of dividing image data read in the pattern reading process into a plurality of blocks in the arrangement direction; and
wherein the processor is configured to, in the dividing process, acquire positions of the mark images and acquire a position of a block axis based on the positions of the mark images, the block axis being a center line, for each of the plurality of blocks, that connects a center position of the mark image at the upstream side and a center position of the mark image at the downstream side.

11. The image processing device according to claim 7,
wherein the processor is configured to, in the pattern writing process, control the image forming section to form, as the pattern image, at least one of a first pattern and a second pattern on the sheet, the second pattern having a higher density than the first pattern.

12. The image processing device according to claim 11,
wherein the processor is configured to, in the pattern writing process, control the image forming section to form both the first pattern and the second pattern if high image quality is required, and control the image forming section to form either one of the first pattern and the second pattern if high image quality is not required.

13. The image processing device according to claim 11,
wherein the plurality of light-emitting-element groups comprises a yellow light-emitting-element group that uses yellow toner as toner for forming an image; and
wherein the processor is configured to, in the pattern writing process, control the image forming section to form the second pattern for the yellow light-emitting-element group.

14. The image processing device according to claim 11,
wherein the processor is configured to, in the pattern writing process, control the image forming section to form at least the first pattern, in order to adjust an amount of light of the plurality of light emitting elements based on the amount of density deviation calculated in the calculating process.

15. The image processing device according to claim 7,
wherein the processor is configured to, in the pattern writing process, control the image forming section to form a linear pattern parallel to the sheet conveying direction, as the pattern image, on the sheet.

16. The image processing device according to claim 15,
wherein the linear pattern is formed by using predetermined light emitting elements that exclude light emitting elements located at both ends in each of the plurality of light-emitting-element groups.

17. The image processing device according to claim 15,
wherein the linear pattern is formed by using predetermined light emitting elements that include light emitting elements located at both ends in each of the plurality of light-emitting-element groups.

18. The image processing device according to claim 7,
wherein the processor is linear pattern parallel to the arrangement direction, as the pattern image, on the sheet.

19. The image processing device according to claim 7,
wherein the processor is configured to, in the pattern writing process, control the image forming section to form a predetermined pattern as the pattern image on the sheet, the predetermined pattern being a pattern in which images formed by neighboring light emitting elements adjoin each other neither in the arrangement direction nor in the sheet conveying direction.

20. A method of acquiring an amount of density deviation of a plurality of light-emitting-element groups mounted on an image processing device, each of the plurality of light-emitting-element groups having a plurality of light emitting elements arranged linearly in an arrangement direction, the method comprising:
controlling an image forming section to form a pattern image on a sheet by using the plurality of light-emitting-element groups such that a length of the pattern image in the arrangement direction corresponds to an entire exposure range of the plurality of light-emitting-groups, the pattern image being an image for detecting density deviation;
controlling a reader to read the pattern image formed on the sheet; and
calculating an amount of density deviation of each of the plurality of light-emitting-element groups based on a reading result by the reader, each of the plurality of light-emitting-element groups being a unit of calculation of the amount of density deviation.

* * * * *